United States Patent
Williams

(10) Patent No.: US 6,357,113 B1
(45) Date of Patent: Mar. 19, 2002

(54) METHOD OF MANUFACTURE OF A GAS TURBINE ENGINE RECUPERATOR

(75) Inventor: Samuel B. Williams, Bloomfield Hills, MI (US)

(73) Assignee: Williams International Co., L.L.C., Walled Lake, MI (US)

( * ) Notice: Subject to any disclaimer, the term of this patent is extended or adjusted under 35 U.S.C. 154(b) by 0 days.

(21) Appl. No.: 09/434,040

(22) Filed: Nov. 4, 1999

(51) Int. Cl.⁷ .................................................. B23P 15/26
(52) U.S. Cl. ................................ 29/890.034; 29/890.034
(58) Field of Search ....................... 29/890.03, 890.034, 29/890.039, 428

(56) References Cited

U.S. PATENT DOCUMENTS

| | | | |
|---|---|---|---|
| 1,662,870 A | 3/1928 | Stancliffe | 165/166 |
| 1,825,498 A | 9/1931 | Wogan | 165/157 |
| 2,510,024 A | 5/1950 | Mayer | 153/76 |
| 2,643,512 A | 6/1953 | Stalker | 60/39.161 |
| 2,650,073 A | 8/1953 | Holm | 165/140 |
| 2,925,714 A | 2/1960 | Cook | 60/39.161 |
| 2,954,068 A | 9/1960 | Williamson | 153/76 |
| 3,216,495 A | 11/1965 | Johnson | 165/166 |
| 3,228,464 A | 1/1966 | Stein et al. | 165/166 |
| 3,255,818 A | 6/1966 | Beam, Jr. et al. | 165/166 |
| 3,285,326 A | 11/1966 | Wosika | 165/4 |
| 3,476,174 A | 11/1969 | Guernsey et al. | 165/9 |
| 3,507,115 A * | 4/1970 | Wisoka | |
| 3,741,293 A | 6/1973 | Haberski | 165/166 |
| 3,748,889 A | 7/1973 | Miller et al. | 72/382 |
| 3,759,323 A | 9/1973 | Dawson et al. | 165/166 |
| 3,818,984 A | 6/1974 | Nakamura et al. | 165/166 |
| 3,831,374 A | 8/1974 | Nicita | 60/39.51 R |
| 3,889,744 A | 6/1975 | Hill et al. | 165/83 |
| 3,892,119 A | 7/1975 | Miller et al. | 72/385 |
| 4,049,051 A | 9/1977 | Parker | 165/166 |
| 4,073,340 A | 2/1978 | Parker | 165/166 |
| 4,098,330 A | 7/1978 | Flower et al. | 165/166 |
| 4,346,582 A | 8/1982 | Bailey | 72/379 |
| 4,346,760 A | 8/1982 | Vidal-Meza | 165/166 |
| 4,352,393 A | 10/1982 | Vidal-Meza | 165/166 |
| 4,434,637 A | 3/1984 | Bailey | 72/17 |
| 4,438,809 A | 3/1984 | Papis | 165/166 |
| 4,450,705 A | 5/1984 | Vidal-Meza | 72/379 |
| 4,697,633 A | 10/1987 | Darragh et al. | 165/51 |
| 4,727,935 A * | 3/1988 | Lapeyre | 29/890.034 |
| 4,890,670 A * | 1/1990 | Schiessl | 165/76 |
| 4,911,235 A | 3/1990 | Andersson et al. | 165/167 |
| 4,974,413 A | 12/1990 | Szego | 60/39.511 |
| 5,004,044 A | 4/1991 | Horgan et al. | 165/145 |
| 5,033,537 A | 7/1991 | Atkin et al. | 165/32 |
| 5,050,668 A | 9/1991 | Peterson et al. | 165/81 |
| 5,060,721 A | 10/1991 | Darragh | 165/165 |
| 5,065,816 A | 11/1991 | Darragh | 165/125 |
| 5,077,894 A * | 1/1992 | Martin et al. | 29/890.039 |
| 5,081,834 A | 1/1992 | Darragh | 60/39.511 |
| 5,082,050 A | 1/1992 | Darragh | 165/81 |
| 5,105,617 A | 4/1992 | Malohn | 60/39.511 |
| 5,279,358 A | 1/1994 | Hannis | 165/103 |
| 5,388,398 A | 2/1995 | Kadambi et al. | 60/39.511 |
| 5,538,073 A * | 7/1996 | Stopa | 29/890.034 |
| 5,855,112 A | 1/1999 | Bannai et al. | 60/39.511 |
| 5,979,050 A * | 11/1999 | Counterman et al. | 29/890.039 |
| 6,112,403 A * | 9/2000 | Ervin et al. | 29/726 |
| 6,115,919 A * | 9/2000 | Oswald et al. | 29/890.039 |

FOREIGN PATENT DOCUMENTS

GB        454229        3/1935

* cited by examiner

Primary Examiner—I Cuda Rosenbaum
(74) Attorney, Agent, or Firm—Dinnin & Dunn P.C.

(57) ABSTRACT

A method of manufacturing a recuperator for a gas turbine engine comprises the steps of stamping a plurality of spaced integral ribs on a metal plate so as to define a plurality of high pressure channels, stamping a plurality of spaced integral ribs on a second metal plate so as to define a plurality of low pressure channels, joining said first and second metal plates to form a cell, and joining a plurality of said cells to one another.

4 Claims, 2 Drawing Sheets

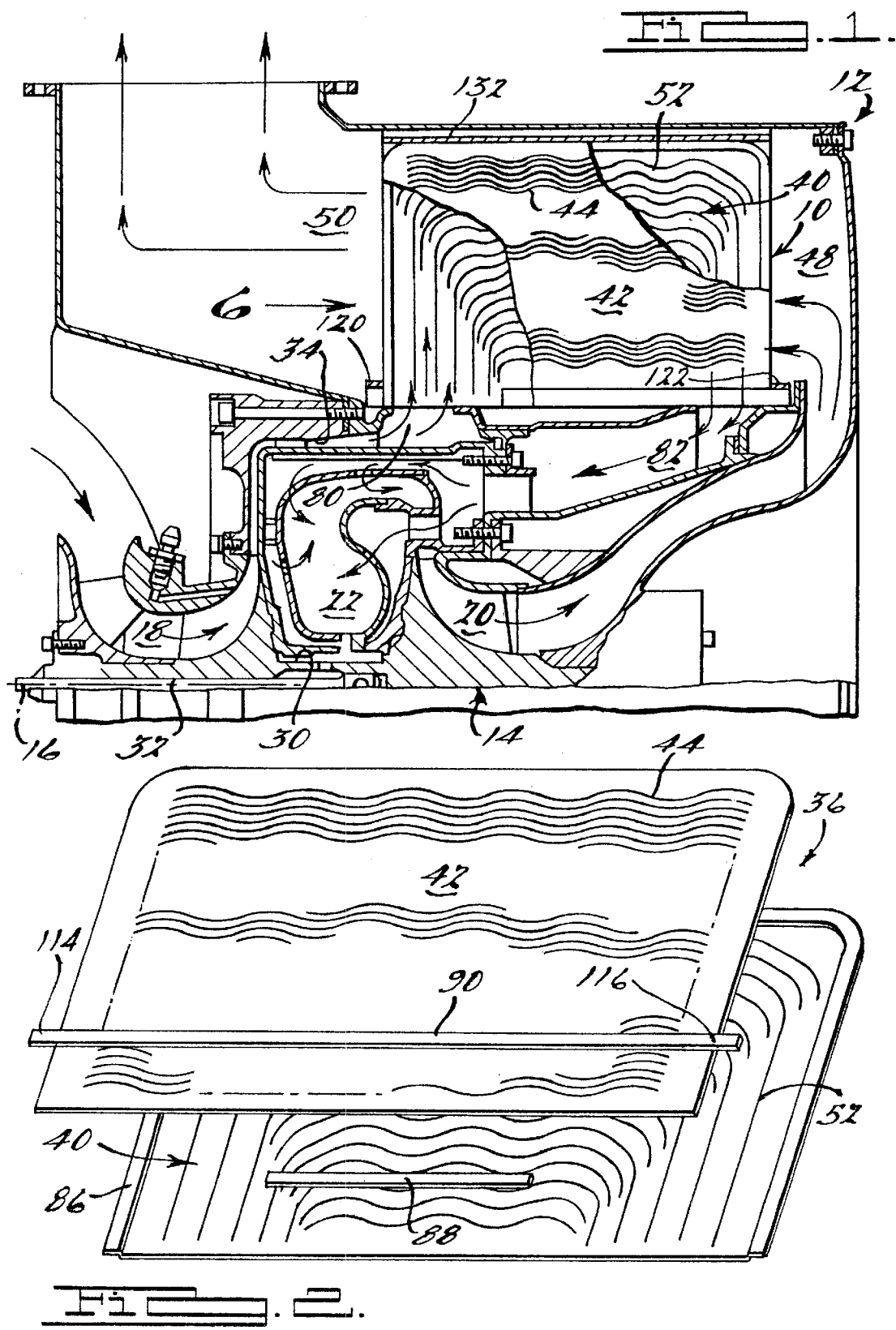

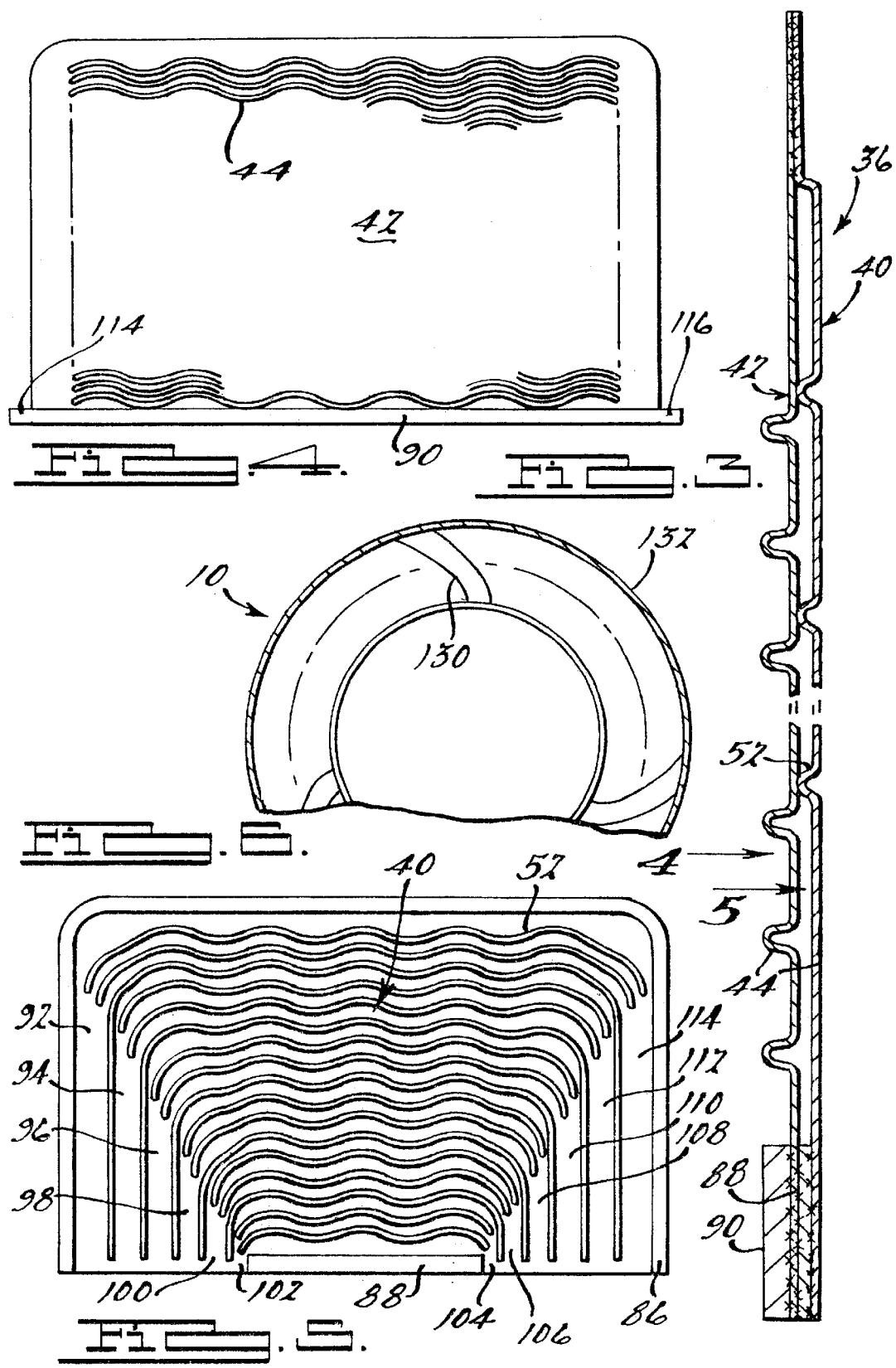

METHOD OF MANUFACTURE OF A GAS TURBINE ENGINE RECUPERATOR

The present invention relates generally to gas turbine engines and more particularly to a method of manufacturing a recuperator for a gas turbine engine.

Gas turbine engine recuperators transfer heat from the relatively hot, low pressure engine exhaust gas to incoming, relatively cold, high pressure combustion air. Use of a recuperator enables the gas turbine engine to approach the fuel economy of a diesel engine as well as to exhibit emission levels below ULEV standards. Moreover, relatively low emission levels can be achieved by recuperator equipped gas turbine engines without the use of a catalytic converter.

However, due to manufacturing complexity, known recuperators, particularly metallic plate-and-fin recuperators of the type disclosed in U.S. Pat. No. 3,507,115, are one of the most expensive components of a gas turbine engine. Moreover, known gas turbine engine recuperators, generally employ conventional seals between the hot and cold sections of the recuperator which rapidly degrade in the gas turbine engine environment.

SUMMARY OF THE INVENTION

The aforesaid problems are solved by the manufacturing method of the present invention. Specifically, the recuperator comprises an annular matrix of cells each of which comprises a low and a high pressure plate. Each plate is made from stainless steel foil that is embossed with an array of undulating ribs. The ribs stop short of the plate edges to facilitate welding to one another along the periphery thereof. The undulating ribs on the plates have different patterns to preclude nesting.

Specifically, a high pressure plate is welded to a low pressure plate by laser or resistance welding, to form a modular cell. The weld joins the flat edge portion of the low pressure plate to an offset flange on the high pressure plate that encompasses three sides thereof. The high pressure plate is provided with a short spacer bar on the radially inner edge that is also welded to the low pressure plate. A relatively longer spacer bar is welded to the exterior of the low pressure plate at the radially inner edge thereof for welding to an adjacent cell. Each cell is subsequently formed to the involute curve of the inside diameter of the annular recuperator.

A plurality of cells are assembled in an annular array to form the recuperator. After the individual cells are assembled, the protruding ends of the spacer bars on the low pressure plates define ring supports that protrude axially at each end of the recuperator annulus. Rings are then shrunk around the protruding ends of the spacer bars to fix the radially inner edges of the cells to one another but leaving radially outer portions of individual recuperator cells free to radially expand and contract.

In accordance with one feature of the invention, only the radially inner edges of the cells are brazed to one another thereby to effect joining and sealing of the cells to one another. Brazing is accomplished by rotating the assembly in a fixture at low speed while a brazing alloy, preferably a nickel or silver manganese braze alloy powder suspended in a suitable liquid carrier, is applied by a spray nozzle to the central cavity of the annular matrix of cells. The nozzle is directed radially outwardly and is moved axially of the annulus to apply a uniform coating of braze alloy to the inside diameter of the annular cell matrix.

The assembled cell matrix is then placed in either a vacuum chamber, a chamber filled with dry hydrogen, or a chamber filled with an inert gas such as argon or nitrogen. A radiation-type heating source is then inserted into the annular cell matrix which is rotated to effect uniform heating of the inner surface thereof. Distortion is minimized by heating only the inside bore of the annular cell matrix to a temperature sufficient only to melt the braze alloy and cause it to flow into the metal-to-metal contact surfaces between adjacent cells at the radially inner edges thereof, thereby allowing the bulk of the cell matrix to remain cool and unaffected by the brazing process.

After brazing, the radially inner surface of the recuperator is machined to define seating surfaces to facilitate assembly of the recuperator to an engine. It is to be noted that the radially outer surfaces of the recuperator cells are not brazed to one another, allowing relative motion between cells to minimize stress caused by thermal gradients and transients.

A stainless steel cylinder is then telescoped over the annular cell matrix so as to retain the cells in the involute shape when pressurized internally.

BRIEF DESCRIPTION OF THE DRAWINGS

FIG. 1 is a fragmentary sectional elevation of a gas turbine engine having a recuperator manufactured in accordance with the present invention;

FIG. 2 is an exploded perspective view of the high and low pressure plates of the recuperator of FIG. 1 prior to being welded to one another to form a cell;

FIG. 3 is a cross sectional view of the plates of FIG. 2 assembled to form a cell prior to being formed to the involute curve;

FIG. 4 is a view taken in the direction of the arrow 4 of FIG. 3;

FIG. 5 is a view taken in the direction of the arrow 5 of FIG. 3; and

FIG. 6 is a view taken in the direction of the arrow 6 of FIG. 1.

DETAILED DESCRIPTION OF THE INVENTION

As seen in FIG. 1 of the drawings, a recuperator 10, in accordance with a preferred constructed embodiment of the present invention, is shown in the environment of a conventional gas turbine engine 12. The engine 12 comprises a shaft assembly 14, that extends along a central axis 16 of the engine 12 and connects a forwardly disposed compressor section 18, to a rearwardly disposed turbine section 20. An annular combustor 22 is disposed radially outwardly of the shaft assembly 14 between the compressor section 18 and turbine section 20. The shaft assembly 14 is adapted to be connected to, for example, power generation equipment (not shown) to utilize shaft horsepower generated by the engine 12. A conventional rotatable fuel slinger 30 is disposed on a cylindrical axially extending slinger sleeve 32 which is part of the rotating shaft assembly 14.

In operation, rotation of the shaft assembly 14 and fuel slinger 30 effects the discharge of fuel radially outwardly into the combustor 22.

Primary combustion air, at ambient temperature, is drawn into the compressor section 18. The relatively cool high pressure air then flows radially outwardly through a high pressure air channel 34 to the recuperator 10, wherein the air is heated. The heated high pressure air then flows axially to the combustor 22 and, after combustion, through the turbine 20.

The recuperator 10 comprises an annular nested assembly or matrix of cells 36 each of which comprises a high pressure plate 40 and a low pressure plate 42.

Each low pressure plate 42 is provided with a plurality of undulating relatively closely spaced ribs 44 that are stamped into the surface thereof to a height of, for example, 0.040 inches. Channels defined by the ribs 44, in combination with the high pressure plate 40 of an adjacent cell 36, communicate at one end with a hot exhaust gas inlet plenum 48 and at an opposite end with a cool exhaust gas outlet plenum 50 which, in turn, vents to atmosphere.

Each high pressure plate 40 has a plurality of ribs 52 that are stamped to a height of, for example, 0.024 inches, in a C-shaped array to define channels which, in conjunction with a low pressure plate 42 of the cell 36, communicate at one end with a compressed air inlet plenum 80 and at the opposite end with a heated compressed air outlet plenum 82. The stamped ribs 52 in a "bight" portion of the high pressure plate 40 undulate in generally parallel flow relation to the ribs 44 on the low pressure plate 42 but do not nest therein.

The high pressure plate 40 has a flanged edge portion 86 of equal height to the ribs 52 thereon which, in combination with a relatively short spacer bar 88, provides welding surfaces for joining the plates 40 and 42 as well as to direct high pressure air flow first radially outwardly from the compressed air plenum 80, thence parallel to the central axis 16 of the engine 12, thence radially inwardly to the heated compressed air exit plenum 82 and combustor 22 of the engine 12. The low pressure plate 42 has a spacer bar 90 at the radially inner edge thereof to direct low pressure exhaust gas flow between the cells 36 from the exhaust gas inlet plenum 48 to the exhaust gas exit plenum 50, thence to atmosphere.

After the plates 40 and 42 forming the individual cells 36 are welded to one another, the cells 36 are formed to the involute curve 130 of the radially inner diameter of the annular recuperator matrix, then assembled by stacking in an annular array. After assembly, opposite ends 114 and 116 of the spacer bars 90 on the individual cells 36 protrude axially at each end of the recuperator 10. Rings 120 and 122 are then shrunk around the protruding ends 114 and 116 of the spacer bars 90 to fix the cell matrix for welding leaving the radially outer portions of the individual cells 36 free to expand and contract radially while the inner edges thereof are fixed to one another.

The assembled annular cell matrix is then rotated in a fixture at low speed while braze alloy is applied by a conventional spray nozzle inserted centrally of the annular cell matrix. The nozzle is directed radially outwardly and is moved axially of the cell matrix so as to apply a uniform coating of braze alloy to the inside diameter of the annular cell matrix. The braze alloy comprises, for example, a conventional nickel or silver manganese braze alloy that consists of finely divided powder suspended in a liquid carrier.

The next step is to place the annular cell matrix in a heated vacuum chamber or a chamber filled with dry hydrogen or an inert gas such as argon or nitrogen. A conventional radiation-type heat source is inserted into the annular cell matrix which is rotated at low speed to effect uniform heating of the radially inner surface thereof. Rotation ensures uniform heating of the inner surface of the annular cell matrix which is continued just long enough to melt the braze alloy and to cause it to flow into the voids between the metal-to-metal contact surfaces between the spacer bars 90 and radially inner edges of the high pressure plates 40, respectively of the individual cells 36. In this manner distortion is minimized by heating only the inside surface of the cell matrix allowing the bulk mass thereof to remain cool and unaffected by the brazing process.

After brazing, the radially inner surface of the cell matrix is machined to form a cylindrical seating surface on the engine 12 that precludes bypassing of high and low pressure air to and from the recuperator 10. It is to be emphasized that the surfaces between individual cells 36 radially outwardly of the spacer bars 88 and 90 thereon, are not brazed to one another, allowing relative motion between the cells 36 to minimize stress caused by thermal gradients and transients.

A stainless steel cylinder 132 is then telescoped over the annular matrix of cells 36 to restrain the cells 36 from radial expansion when the recuperator 10 is pressurized internally.

While the preferred embodiment of the invention has been disclosed, it should be appreciated that the invention is susceptible of modification without departing from the scope of the following claims.

I claim:

1. A method of manufacturing an annular recuperator for a gas turbine engine comprising the steps of;

stamping a plurality of spaced integral ribs on a first metal plate so as to partially define a plurality of high pressure channels;

stamping a plurality of spaced integral ribs on a second metal plate so as to partially define a plurality of low pressure channels;

joining said first and second metal plates to form a cell wherein said high pressure channels are fully defined and disposed internally thereof;

assembling said cells in an annular array with the first and second metal plates thereof, respectively, in juxtaposed relation so as to define said low pressure channels; and joining only a radially inner edge portion of said cells to one another.

2. The method of claim 1 comprising the step of applying a brazing alloy to only the radially inner surface of the annular array of cells.

3. The method of claim 2 comprising the step of spraying the brazing alloy into the radially inner surface of the annular array of cells.

4. The method of claim 3 comprising the step of inserting a heat source internally of the annular array of cells to melt said brazing alloy.

* * * * *